(12) United States Patent
Goldband et al.

(10) Patent No.: US 11,747,496 B2
(45) Date of Patent: Sep. 5, 2023

(54) SYSTEM AND METHOD FOR ACOUSTICALLY DETECTING CROSS BORES

(71) Applicant: ULC TECHNOLOGIES, LLC, Hauppauge, NY (US)

(72) Inventors: Ryan S. Goldband, Merrick, NY (US); Baiyang Ren, Nesconset, NY (US)

(73) Assignee: ULC TECHNOLOGIES, LLC, Hauppauge, NY (US)

( * ) Notice: Subject to any disclaimer, the term of this patent is extended or adjusted under 35 U.S.C. 154(b) by 1118 days.

(21) Appl. No.: 16/441,529

(22) Filed: Jun. 14, 2019

(65) Prior Publication Data

US 2019/0383957 A1    Dec. 19, 2019

Related U.S. Application Data

(60) Provisional application No. 62/685,628, filed on Jun. 15, 2018.

(51) Int. Cl.
| | |
|---|---|
| *G01V 1/00* | (2006.01) |
| *G01N 29/24* | (2006.01) |
| *G01S 1/74* | (2006.01) |
| *G01N 29/265* | (2006.01) |
| *E21B 7/04* | (2006.01) |
| *E21B 47/095* | (2012.01) |

(52) U.S. Cl.
CPC ......... *G01V 1/001* (2013.01); *G01N 29/2437* (2013.01); *G01N 29/2481* (2013.01); *G01N 29/265* (2013.01); *G01S 1/74* (2013.01); *E21B 7/046* (2013.01); *E21B 47/095* (2020.05); *G01N 2291/2636* (2013.01)

(58) Field of Classification Search
CPC .......... G01V 1/001; G01V 1/003; G01V 1/20; G01V 2210/121; G01V 2210/1299; G01V 2210/1429; G01N 29/2437; G01N 29/2481; G01N 29/265; G01N 29/11; G01N 29/348; G01N 2291/2636; G01N 2291/015; G01S 1/74; G01S 11/14; E21B 7/046; E21B 47/095
See application file for complete search history.

(56) References Cited

U.S. PATENT DOCUMENTS

| | | |
|---|---|---|
| 5,457,995 A | 10/1995 | Staton et al. |
| 6,003,376 A | 12/1999 | Burns et al. |

(Continued)

*Primary Examiner* — Suman K Nath
(74) *Attorney, Agent, or Firm* — Husch Blackwell LLP

(57) ABSTRACT

An assembly and method for detecting cross bores involving a sewer system and a gas pipe includes an acoustic generator placed within an interior of the sewer system and an acoustic receiver placed either within an interior of the gas pipe or in proximity to an end of the gas pipe. The acoustic generator generates an acoustic signal to transmit through the interior of a sewer pipe of the sewer system. A controller detects, in response to the acoustic receiver hearing the acoustic signal, a cross bore involving the sewer pipe and the gas pipe. A microphone may be placed within the interior of the sewer system at a location remote from the acoustic generator. In this case, the controller determines, in response to the acoustic receiver not hearing the acoustic signal and the microphone hearing the acoustic signal, that a cross bore involving the sewer pipe and the gas pipe is absent.

22 Claims, 5 Drawing Sheets

(56) References Cited

U.S. PATENT DOCUMENTS

| | | |
|---|---|---|
| 8,988,969 B2 | 3/2015 | Wallbom et al. |
| 2011/0061463 A1* | 3/2011 | Ersoy ................ G01V 3/08 |
| | | 73/584 |
| 2011/0261649 A1* | 10/2011 | Wallbom ............ E21B 47/0224 |
| | | 367/81 |

* cited by examiner

SYSTEM AND METHOD FOR ACOUSTICALLY DETECTING CROSS BORES

CROSS-REFERENCE TO RELATED APPLICATIONS

This application claims the benefit of U.S. Provisional Application No. 62/685,628, filed Jun. 15, 2018, the disclosure of which is hereby incorporated in its entirety by reference herein.

TECHNICAL FIELD

The present invention relates to detecting underground, i.e., below ground surface, cross bores.

BACKGROUND

A variety of trenchless excavation technologies have been developed to increase installation efficiency of various underground utilities. Horizontal direction drilling (HDD), for example, is increasingly being used for utility line installations. Other popular trenchless excavation technologies include percussive moles and plowing. Trenchless excavation technologies have the advantage of not being disruptive to the surface, yards, roads, driveways, traffic, and trees, for example, but have the disadvantage of not allowing installers to see with their own eyes where utility lines are being installed.

A concerning situation arises when a new utility is to be installed in a subsurface where an existing underground utility is located. In this scenario, a cross bore may arise. A cross bore is generally understood in the industry as an intersection of an existing underground utility or underground structure by a second utility resulting in direct contact between the transactions of the utilities that can compromise the integrity of either utility or underground structure.

By way of example, it sometimes occurs that a utility installation contractor using an HDD machine to install a gas service line inadvertently drills through or very near a main sewer or sewer lateral pipe and unknowingly installs a gas supply pipeline through or in contact with the sewer pipe. This direct or proximal unintended contact between underground utilities represents a cross bore. At some later date when a back-up occurs in the sewer, the owner might engage a sewer cleaner using a cutter device to clear the sewer. This can lead to a breach in the gas line and subsequent ignition of gas which flows into the sewer line.

It can be appreciated that installing new utilities within a subsurface that includes legacy utilities is problematic in cases where the location, size, orientation, type, material, and other characteristics of such legacy utilities are either uncertain or unknown. Sewer authorities may complain that newly constructed sewer lines are being damaged when underground utility lines are installed, and utility installers may complain that sewers are not properly located, or their locations are not accurately documented.

In view of the thousands of miles of sewers situated where utility lines have been installed with trenchless technologies, there may exist a legacy of thousands of cross bores of gas supply pipelines alone in sewers. In addition to gas explosion concerns, damage done to existing utilities due to cross bores is dramatic. For example, holes broken into sewers increases infiltration and inflow of water into sewers, creating structural deficiencies that may eventually create sinkholes and voids that may be extremely expensive to repair.

SUMMARY

Embodiments of the present invention are directed to systems and methods for acoustically detecting cross bores including legacy cross bores and cross bores occurring at the time of installation. The systems and methods generally involve transmitting an acoustic signal through a first pipe system while listening for the acoustic signal in a second pipe system to determine whether a cross bore (i.e., an intersection) exists between the two pipe systems.

Embodiments of the present invention were developed to determine whether a cross bore is between two piping systems. For instance, a cross bore exists when a natural gas main is intersecting with a sewer lateral. A gas main intersecting a sewer lateral creates a dangerous situation. The gas main sits within the sewer lateral and could clog the sewer lateral. A person clearing the blockage in the sewer lateral could break the gas main in the process.

Commercially available methods to detect whether a gas main is intersecting with a sewer lateral involve sending a camera through the sewers to try and see the gas main. This process is slow, expensive, and the condition of the sewer can make it impossible for a camera to travel through the sewer making it impossible to inspect.

Embodiments of the present invention allow a utility company, such as a utility company with natural gas distribution infrastructures, verification that their gas main is not intersecting with a sewer pipe in a quicker, less expensive, and more reliable way.

An embodiment provides an acoustic cross bore detection system. The detection system includes an acoustic source (i.e., acoustic generator) configured to generate an acoustic signal (e.g., a sound, sound wave, etc.) and an acoustic receiver configured to listen for the acoustic signal. The acoustic source is located at an access point of a first pipe system. The acoustic receiver is located either inside a second pipe system or in proximity to an end of the second pipe system. In operation, the acoustic source generates an acoustic signal which transmits from the access point of the first pipe system through the interior of the first pipe system. The acoustic receiver listens for the acoustic signal. The detection system further includes a controller configured to determine, in response to the acoustic receiver hearing the acoustic signal, that a cross bore exists between the two pipe systems. The controller is further configured to determine, in response to the acoustic receiver not hearing the acoustic signal, that no cross bore is between the two pipe systems.

The controller may further be configured to control the acoustic source in generating the acoustic signal and/or control the acoustic receiver in listening for the acoustic signal to provide detection synchronization between the generation of and the listening for the acoustic signal.

The acoustic receiver "hearing" (i.e., "hears") the acoustic signal means that the acoustic receiver hears or detects a received acoustic signal having an amplitude greater than a determined threshold. The acoustic receiver "not hearing" (i.e., "does not hear") the acoustic signal means that the acoustic receiver does not hear or detect any of the acoustic signal or, at best, very weakly hears or detects the acoustic signal.

The controller determines that a cross bore exists between the two pipe systems when the acoustic receiver hears the acoustic signal as follows. When a cross bore exists between the two pipe systems, a pipe of the second pipe system extends through a break in a wall of a pipe of the first pipe system into the interior of the pipe of the first pipe system. The acoustic signal traveling through the interior of the first pipe system is efficiently transferred at the break in the wall of the pipe of the first pipe system to the second pipe system. This relatively-strong, transferred acoustic signal portion travels through the interior of the second pipe system and is heard by the acoustic receiver.

The controller determines that no cross bore is between the two pipe systems when the acoustic receiver does not hear the acoustic signal as follows. When no cross bore exists between the two pipe systems, no pipe of the second pipe system extends into the interior of a pipe of the first pipe system. Accordingly, as the acoustic signal must penetrate a wall of the first pipe system to reach the second pipe system there will be an inefficient transfer of the acoustic signal from the first pipe system to the second pipe system. Furthermore, the soil between underground, non-intersecting pipe systems will dampen any portion of the acoustic signal penetrating through the wall of a pipe system.

The acoustic receiver not hearing any of the acoustic signal and the controller consequently determining that no cross bore exists is the ideal scenario. In typical situations, the acoustic receiver may hear something such that the controller or an operator may have to decide. For example, if the acoustic source is very close to a sewer lateral and the acoustic signal is very weakly heard by the acoustic receiver, then this may indicate that there is no cross bore. Therefore, the controller or the operator may have to decide based on the amplitude of the received acoustic signal and the proximity of the acoustic source.

In sum, on one hand, when the two pipe systems are intersecting, the acoustic signal introduced into the first pipe system can be relatively easily heard in the second pipe system. On the other hand, when the two pipe systems are not intersecting, the acoustic signal introduced into the first pipe system is, at best, very weakly heard in the second pipe system.

Another embodiment provides an acoustic cross bore detection method. The method includes generating, by an acoustic source located at an access point of a first pipe system, an acoustic signal which transmits from the access point of the first pipe system through the interior of the first pipe system. The method further includes listening for the acoustic signal by an acoustic receiver located either inside a second pipe system or in proximity to an end of the second pipe system. The method further includes determining, in response to the acoustic receiver hearing the acoustic signal, that a cross bore exists between the two pipe systems. The method further includes determining, in response to the acoustic receiver not hearing the acoustic signal, that no intersection exists between the two pipe systems.

Preferred embodiments involve an acoustic source transmitting an acoustic signal through the air, or even water, within sewer pipes. Acoustic signals travel efficiently through the air and water within sewer pipes. This allows the acoustic signal to travel far distances without much loss. In embodiments, the acoustic source is physically placed within the sewer system. For instance, the acoustic source is moved through an access point of the sewer pipe, such as a manhole opening, into the interior of the sewer pipe.

In an embodiment, the acoustic source is located at an access point of a sewer pipe and is not within or sent inside the sewer pipe. For instance, the access point is a manhole opening and the acoustic signal is sent from the manhole opening (for instance, by banging on the manhole cover with a hammer) and is listened for in a gas main. This provides a simpler and cleaner system than sending a device into a sewer main.

In embodiments, the acoustic source for introducing the acoustic signal into the first pipe system may be, for instance, a speaker, a hammer for hitting something such as a manhole cover covering an access point of the first pipe system, a horn, a piezo element, and the like.

In embodiments, the acoustic receiver for listening for the acoustic signal may be, for instance, a microphone, a piezo element, a vibrometer, and the like. The microphone may be an electret microphone, a condenser microphone, a MEMS microphone, a contact microphone, and the like.

In embodiments, the first pipe system includes one or more pipes and the second pipe system includes one or more pipes. One or more of the pipes of the first pipe system are installed underground and one or more of the pipes of the second pipe system are installed underground.

In embodiments, the first pipe system is a sewer pipe system at least partially installed underground and the second pipe system is a gas pipe system at least partially installed underground. The acoustic signal transmits through the interior of the sewer pipe system and is listened for in the gas pipe system. The sewer pipe system may include a main sewer pipe and one or more lateral sewer pipes. Similarly, the gas pipe system may include a main gas pipe and one or more lateral gas pipes. In one case, for instance, the acoustic source is located at an access point of the main sewer pipe, such as a manhole opening or a sewer vent, and the acoustic receiver is located inside or in proximity to an end of the main gas pipe or inside or in proximity to an end of any of the lateral gas pipes.

In embodiments, the acoustic receiver is configured to move through the second pipe system to listen for the acoustic signal. The acoustic receiver may move through the second pipe system to assist in attempting to locate the exact location of any cross bore between the two pipe systems. In this case, an acoustic cross bore detection system having the acoustic receiver may further include a movable support. The movable support is part of a robot assembly, a push rod cable, a tether, etc. The acoustic receiver is mountable to the movable support. The movable support with the acoustic receiver mounted thereto are inserted into a pipe of the second pipe system and moved through the pipe and perhaps other pipes of the second pipe system. For instance, the movable support is self-propelled (e.g., motorized robot assembly), pushed with a push rod cable, or pulled with a tether through a pipe to move with the acoustic receiver mounted thereto through the second pipe system.

A controller of the acoustic cross bore detection system may be configured to control movement of the movable support with the acoustic receiver mounted thereto through the second pipe system as a function of the magnitude of the acoustic signal heard by the acoustic receiver. For instance, the controller may cause the acoustic receiver to be moved back and forth until the magnitude of the acoustic signal heard by the acoustic receiver is the strongest thereby indicating as best accurately the position of a cross-bore between the two pipe systems. Likewise, the controller may be further configured to pause or stop movement of the acoustic receiver upon the acoustic receiver hearing the acoustic signal to thereby provide an indication of the location of a cross-bore between the two pipe systems.

The movable support may further include a beacon in operable communication with the acoustic receiver. The beacon is configured to activate to transmit a wireless signal for receipt by a beacon receiver aboveground such as upon the acoustic receiver hearing the acoustic signal.

The movable support may further include a global positioning sensor (GPS) locator. The GPS locator is configured to output to an above-ground GPS receiver a position signal indicative of the location of the acoustic receiver such as upon the acoustic receiver hearing the acoustic signal.

In embodiments, the acoustic source is configured to move through the first pipe system. The acoustic source may move through the first pipe system while generating the acoustic sound to signal. In this case, the acoustic source may be mountable to a movable support such as described above for the acoustic receiver.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As indicated, a cross bore includes an intersection of a first underground utility (e.g., a sewer line) by a second underground utility (e.g., a gas line) resulting in direct contact (i.e., the intersection) between the transactions of the utilities which compromises the integrity of either or both utilities. Installation operations such as HDD can unknowingly cause a gas pipeline to be inserted through an existing underground utility such as an existing sewer pipe Certain types of existing utilities in the path of a new installation are identified and located before the drilling operation. Available locating technologies are typically focused on detecting metallic pipes or pipes buried with a metallic tracer wire. Sewer pipes, however, are generally non-metallic and are commonly not installed with metallic tracer wires. Consequently, installations occur in which a gas pipe has been unintentionally inserted through a sewer pipe with no one being aware of this cross bore. A subsequent sewer line cleaning process can damage or rupture the gas pipe such as to result in a gas leakage through the sewer pipe.

Figure 1:
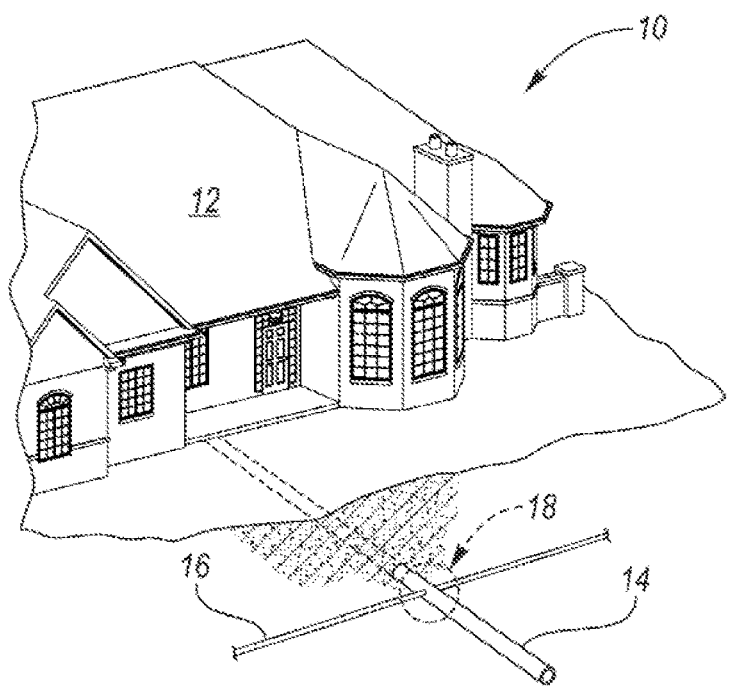
FIG. 1 illustrates a schematic diagram of an environment including a house provided with sewer and gas services, including a lateral sewer line and a main gas line with the main gas line intersecting the lateral sewer line thereby resulting in a (sewer) cross bore at the location of the intersection.

FIG. 1 illustrates a schematic diagram of an environment 10 including a house 12 provided with sewer and gas services. A lateral sewer line (i.e., a sewer pipe) 14 is connected to house 12 to provide sewer services to the house. Lateral sewer line 14 is located underground. A main gas line (i.e., a gas pipe) 16 provides gas to house 12 via a lateral gas line (not shown) connected to the house. Main gas line 16 is also located underground.

As shown in FIG. 1, a problem exists in that main gas line 16 intersects (i.e., literally extends through) lateral sewer line 14. A (sewer) cross bore 18 thus results at the location of the intersection. Cross bore 18 may be formed by trenchless drilling of a gas bore for main gas line 16 which penetrates through lateral sewer line 14 and subsequently installing main gas line 16 in the gas bore.

It should be understood in FIG. 1 and elsewhere herein that the sewer and gas lines are used as examples of the types of underground utilities. Either or both could be substituted for other types of underground utilities such as water, electrical, communications, etc.

Figure 2:
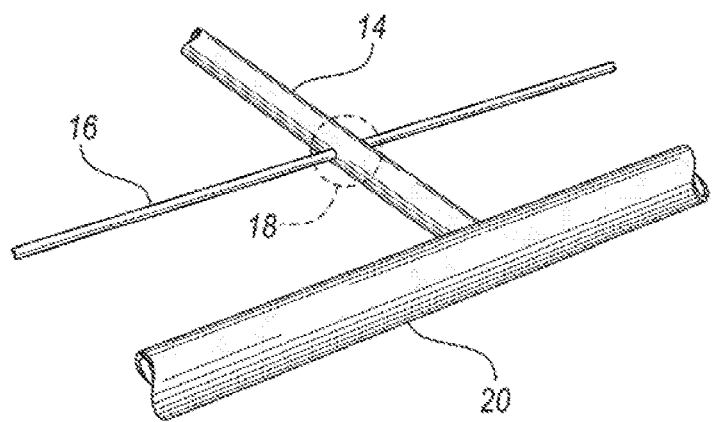
FIG. 2 illustrates a schematic diagram of the main gas line intersecting the lateral sewer line thereby resulting in the cross bore at the location of the intersection, the lateral sewer line leading into a main sewer line.

FIG. 2 illustrates a schematic diagram of main gas line 16 intersecting lateral sewer line 14 thereby resulting in cross bore 18 at the location of the intersection. Lateral sewer line 14 at one end leads into a main sewer line (i.e., a second sewer pipe) 20. Lateral sewer line 14 at another end leads into house 12 as shown in FIG. 1.

As illustrated in FIG. 2, the gas line intersecting lateral sewer line 14 is main gas line 16. Of course, a different gas line such as a lateral gas line could have been depicted in FIG. 2 as intersecting lateral sewer line 14 thereby resulting in cross bore 18.

Figure 3:
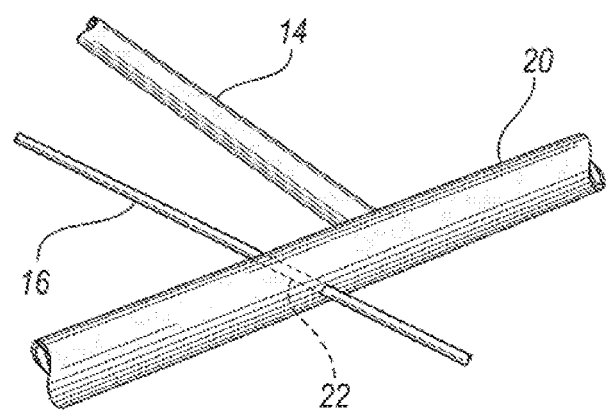
FIG. 3 illustrates a schematic diagram of the main gas line intersecting the main sewer line thereby resulting in a cross bore at the location of the intersection.

FIG. 3 illustrates a schematic diagram of main gas line 16 intersecting main sewer line 20 thereby resulting in a cross bore 22 at the location of the intersection. Of course, a different gas line such as a lateral gas line could have been depicted in FIG. 3 as intersecting main sewer line 20 thereby resulting in cross bore 22.

Figure 4:
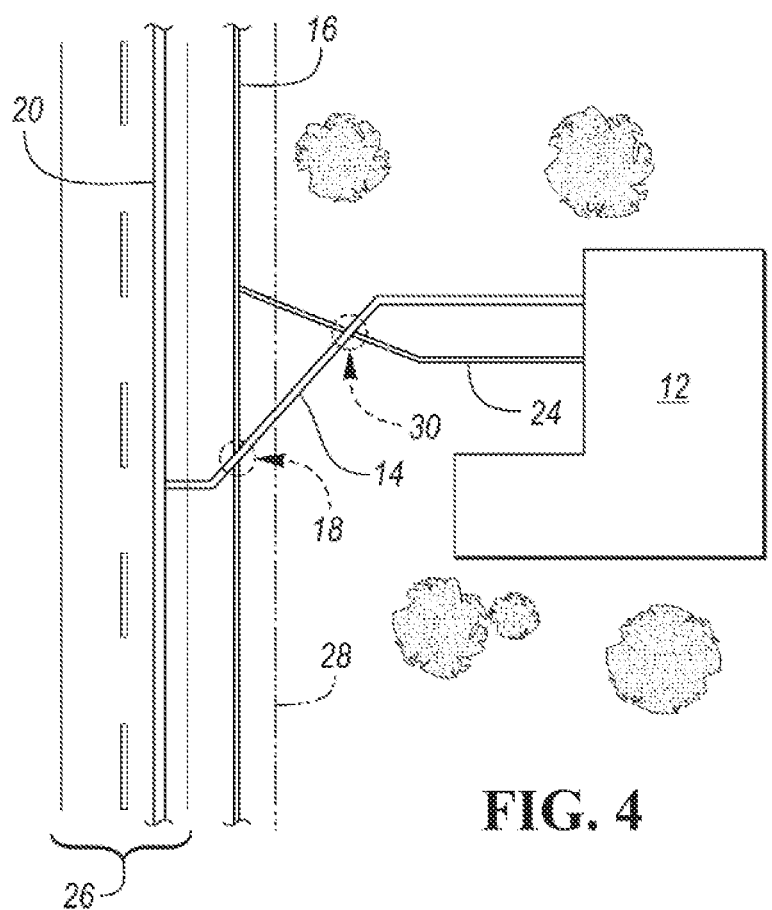
FIG. 4 illustrates a plan view of the house connected to the lateral sewer line and a lateral gas line and located in a neighborhood having the main sewer line and the main gas line, the lateral gas line intersecting the lateral sewer line thereby resulting in a first cross bore at the location of this intersection and the main gas line intersecting the lateral sewer line thereby resulting in a second cross bore at the location of this intersection.

FIG. 4 illustrates a plan view of house 12 connected to lateral sewer line 14 and a lateral gas line 24 and located in a neighborhood having main sewer line 20 and main gas line 16. Main sewer line 20 is buried beneath a street 26. Main gas line 16 is buried between street 26 and a property line 28 of house 12.

Two cross bore situations exist in FIG. 4. First, lateral gas line 24 intersects lateral sewer line 14 thereby resulting in a cross bore 30 at the location of this intersection. Second, main gas line 16 intersects lateral sewer line 14 thereby resulting in cross bore 18 at the location of this intersection.

Figure 5A:
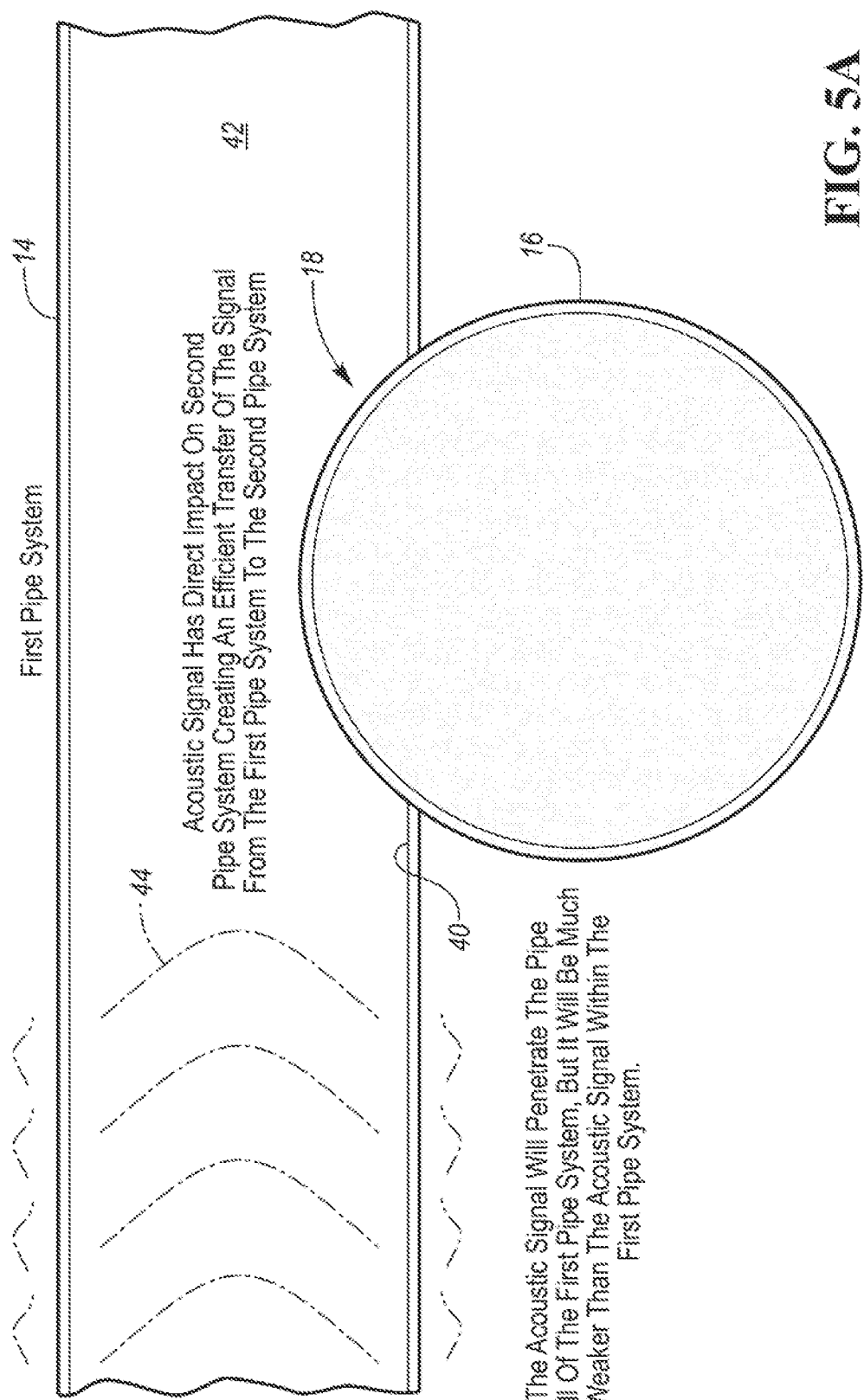
FIG. 5A illustrates a schematic drawing depicting an acoustic signal traveling through a pipe of a first pipe system in which a cross bore exists between the pipe of the first pipe system and a pipe of a nearby second pipe system.
Figure 5B:
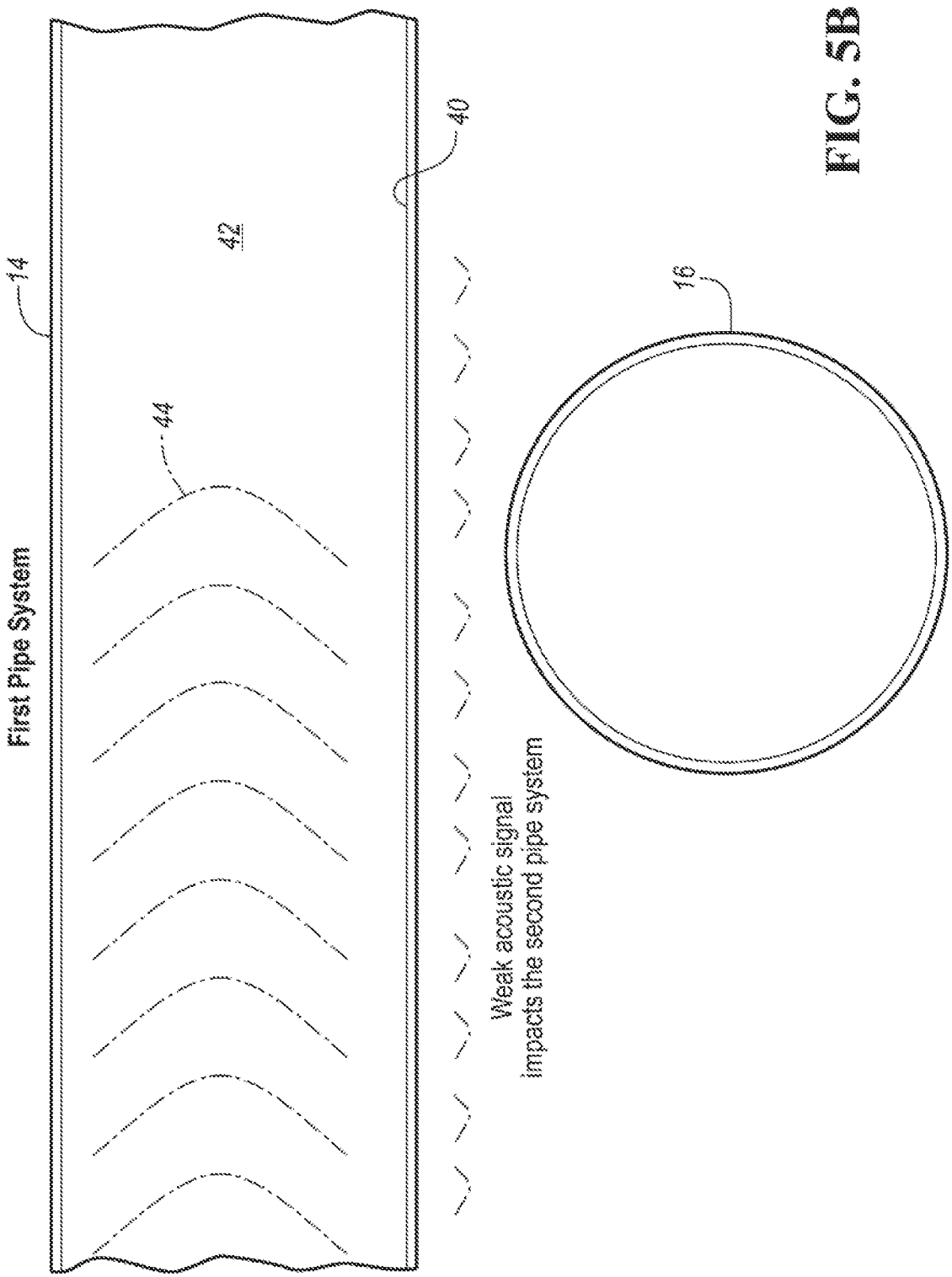
FIG. 5B illustrates a schematic drawing depicting an acoustic signal traveling through the pipe of the first pipe system in which no cross bore exists between the pipe of the first pipe system and the pipe of the nearby second pipe system.

Referring now to FIGS. 5A and 5B, schematic drawings depicting an acoustic signal traveling through a pipe of a first pipe system are shown. A pipe of a second pipe system is nearby the pipe of the first pipe system. In this embodiment, the first pipe system is a sewer pipe system and the first pipe of the sewer pipe system is a lateral sewer pipe 14; and the second pipe system is a gas pipe system and the pipe of the gas pipe system is a gas pipe 16.

In operation for acoustically detecting a cross bore, an acoustic generator (not shown) at an access point of a main sewer pipe (not shown) of the sewer pipe system generates an acoustic signal. The acoustic signal travels through the interior of the main sewer pipe. At the junction where, lateral sewer pipe 14 meets the main sewer pipe, a portion of the acoustic signal transfers into the interior of lateral sewer pipe 14. This portion of the acoustic signal travels through the interior 42 of lateral sewer pipe 14, indicated in FIGS. 5A and 5B as acoustic signal wave-fronts 44 ("acoustic signal 44"). Acoustic signal 44 travels away from the junction and through interior 42 of lateral sewer pipe 14 as indicated in FIGS. 5A and 5B.

In FIG. 5A, a cross bore 18 exists between lateral sewer pipe 14 and gas pipe 16 as the gas pipe extends through a break in a wall 40 of the lateral sewer pipe into the interior 42 of the lateral sewer pipe. As such, as indicated in FIG. 5A, gas pipe 16 physically extends into the interior 42 of lateral sewer pipe 14. A portion of acoustic signal 44, which is traveling through the interior 42 of lateral sewer pipe 14, is efficiently transferred at the break in wall 40 of the lateral sewer pipe to gas pipe 16. This relatively-strong, transferred acoustic signal portion travels through gas pipe 16 and is heard by an acoustic receiver (not shown) located either within the interior of the gas pipe or in proximity to the end of the gas pipe. As described herein, a controller determines that cross bore 18 exists between lateral sewer pipe 14 and gas pipe 16 when the acoustic receiver hears the acoustic signal.

In FIG. 5B, no cross bore exists between lateral sewer pipe 14 and gas pipe 16 as the gas pipe does not physically extend into interior 42 of the lateral sewer pipe. Accordingly, as acoustic signal 44 must penetrate wall 40 of lateral sewer pipe 14 there will be an inefficient transfer of the acoustic signal to gas pipe 16. Any weak acoustic signal portion transferred to gas pipe 14 will not be able to be heard by the acoustic receiver. As described herein, a controller determines that no cross bore is between the sewer pipe system and gas pipe 16 when the acoustic receiver does not hear the acoustic signal.

Figure 6:
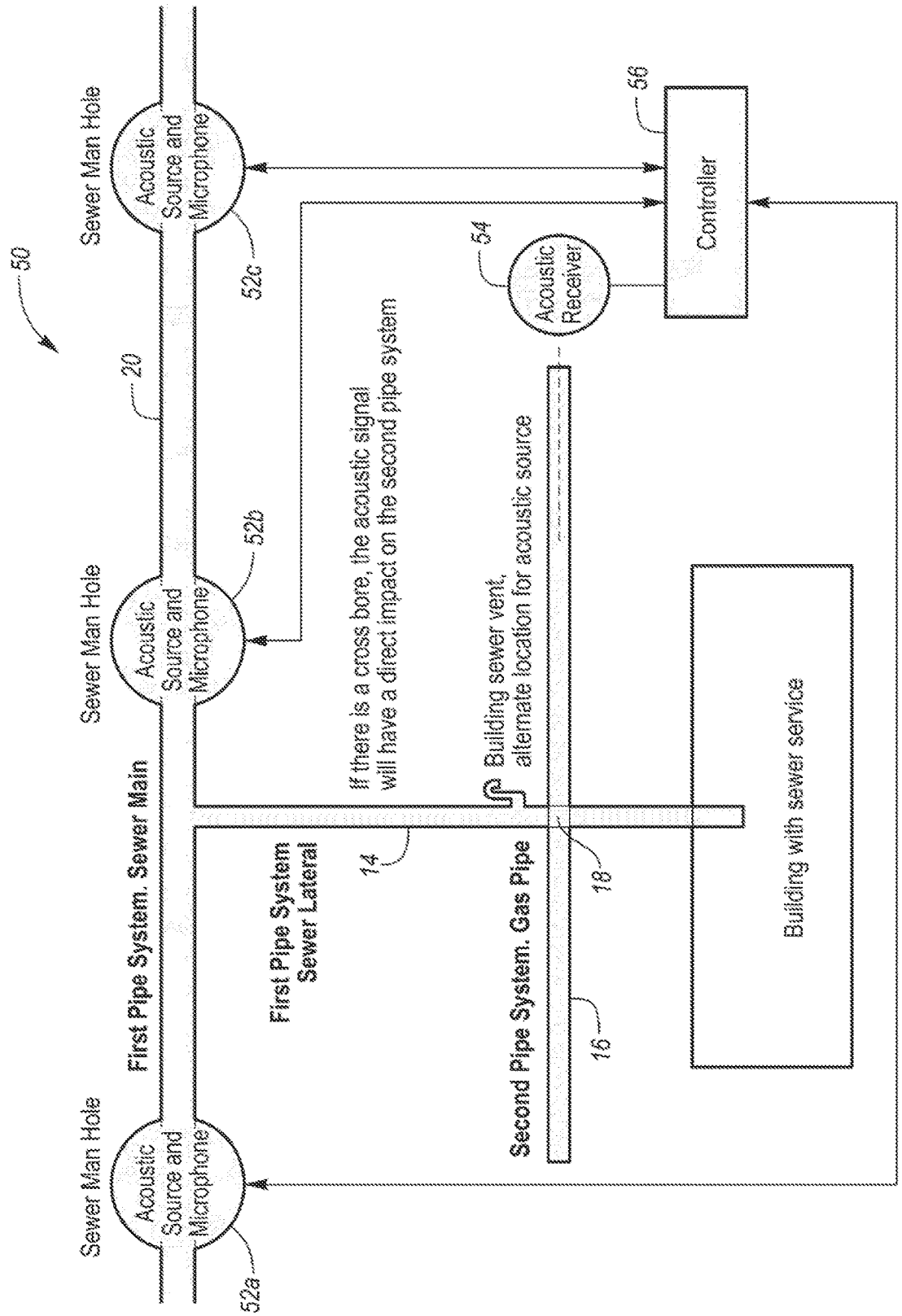
FIG. 6 illustrates a block diagram of an acoustic cross bore detection system.

Referring now to FIG. 6, with continual reference to FIGS. 5A and 5B, a block diagram of an acoustic cross bore detection system 50 is shown. Detection system 50 is operable for detecting a cross bore between first and second pipe systems. For instance, in this embodiment, the first pipe system is a sewer pipe system having a main sewer pipe 20 ("sewer main 20") connected to a lateral sewer pipe 14 ("sewer lateral 14"); and the second pipe system is a gas pipe system having a gas pipe 16.

Detection system 50 includes an acoustic source (i.e., an acoustic generator) 52, an acoustic receiver 54, and a controller 56. Controller 56 is an electronic device such as a processor, micro-controller, or the like (e.g., a computer). Controller 56 is in communication with acoustic source 52 and acoustic receiver 54.

Acoustic source 52 is configured to generate an acoustic signal (e.g., a sound, sound wave, etc.). Acoustic receiver 54 is configured to listen for the acoustic signal. Acoustic source 52 is located at an access point of sewer main 20. For example, the access point of sewer main 20 is a sewer man hole. In this case, acoustic source 52 is inserted through the sewer man hole and physically placed within the interior of sewer main 20. In this way, acoustic source 52 is within the interior of sewer main 20 at a location along the sewer main corresponding to the location of the access point. Acoustic receiver 54 is located at an end of gas pipe 16 as indicated in FIG. 6. Alternately, as indicated by the dashed line in FIG. 6, acoustic receiver 54 may be placed within the interior of gas pipe 16 and may be movable through the gas pipe.

Acoustic source 52 generates an acoustic signal which travels from the access point of sewer main 20 through the interior (i.e., the air and/or water within the interior) of the sewer main. A portion of the acoustic signal transfers from the interior of sewer main 20 into sewer lateral 14 and travels through the interior of the sewer lateral. Acoustic receiver 54 listens for the acoustic signal.

Controller 56 determines, in response to acoustic receiver 54 hearing the acoustic signal, that a cross bore (i.e., an intersection) exists between sewer lateral 14 and gas pipe 16. Acoustic receiver 54 can hear the acoustic signal when sewer lateral 14 and gas pipe 16 intersect as the acoustic signal efficiently transfers from the sewer lateral to the gas pipe at the intersection between the sewer lateral and the gas pipe.

Conversely, controller 56 determines, in response to acoustic receiver 54 not hearing the acoustic signal, that no cross bore is between the two pipe systems. Acoustic receiver 54 cannot hear the acoustic signal when sewer lateral 14 and gas pipe 16 do not intersect as there is no efficient transfer of the acoustic signal from the sewer lateral to gas pipe 16.

As shown in FIG. 6, detection system 50 may further include additional acoustic sources, such as acoustic sources 52b and 52c shown in FIG. 6, respectively located at other access points (i.e., other sewer man holes) of sewer main 20. In general, the acoustic sources are to be located along the length of the gas pipe system being inspected. The acoustic sources can be placed at alternate locations. For instance, as further indicated in FIG. 6, the acoustic sources can be placed into sewer vents along the path of a gas pipe being installed. In addition to manholes and vents, other access features of the sewer system for acoustic generators and acoustic receivers include drains, cleanouts, and the like.

As shown in FIG. 6, the acoustic sources can have listening devices (e.g., acoustic receivers such as microphones in the sewer manholes). The listening devices are co-located with the acoustic sources and may be physically placed with the acoustic sources within the interior of the sewer main. Providing the listening devices at respective locations along the sewer main allows an operator to ensure that the acoustic sound generated by a given acoustic source 52, 52b, 52c, etc., is efficiently traveling within the sewer main. When a large obstruction is in the sewer main the sound does not travel as far and might not reach to the sewer laterals. Listening devices placed at the locations of the acoustic sources enable the operator to determine whether a large obstruction is in the sewer main by analyzing the amplitude of received acoustic signals from the other acoustic sources in the system.

As described, listening devices provided along the sewer main provide a way to check the efficiency of the acoustic sound coupling from a given acoustic source in the sewer main to the sewer laterals. False negative (miss detection) regarding an acoustic source in the sewer main is thereby controllable by having a listening device in the sewer main remotely located from the acoustic source. This listening device is provided to confirm whether the acoustic signal from the acoustic source is traveling through the sewer main and thereby can reach the sewer lateral(s).

Detection system 50 may further include an additional acoustic receiver located either within the interior of the gas pipe or in proximity to another end of gas pipe 16 or may further include additional acoustic receivers located either within the interior of other gas pipes or in proximity to ends of the other gas pipes.

Acoustic source 52 may generate the acoustic signal at a specific frequency, set of frequencies, or frequency sweep. In generating the acoustic signal, acoustic source 52 may modulate the acoustic signal with unique signature information (i.e., a modulation pattern). Acoustic receiver 54 filters acoustic signals received by the acoustic receiver for the specific frequency, set of frequencies, or frequency sweep. Controller 56 compares the resultant signal, by means of a correlation coefficient or other comparison method, to the modulation pattern to determine whether the acoustic signal from acoustic source 52 is being received by acoustic receiver 54.

Acoustic receiver 54 receiving the acoustic signal from acoustic source 52, either inside the gas pipe or in proximity to an end of gas pipe 16 or as the acoustic receiver travels through the gas pipe, is a strong indication that a cross bore 18 exists. To locate cross bore 18, acoustic receiver 54 may be moved through gas pipe 16. Cross bore 18 is located where acoustic receiver 54 receives a maximum amplitude of the acoustic signal. The location of cross bore 18 can then be determined above ground by activating a sonde in acoustic receiver 54 and using a sonde locator, such as part of controller 56, above ground.

Other methods for determining the location of cross bore 18 can be used such as an encoder in acoustic receiver 54 that measures the distance the acoustic receiver travels. Once the above ground location is determined, controller 56 can measure the distances from the access points of the acoustic sources and take note of the signal levels received by the acoustic receivers at the access points. Controller 56 can use all this information to help determine if actual cross bore exists or whether it is a near miss. For example, if an acoustic source is very close to a sewer lateral, the acoustic signal is very weakly heard by the acoustic receiver, and the acoustic signal is traveling effectively through the sewer main, then this may indicate that there is no cross bore. Therefore, controller 56 may have to decide based on the amplitude of the received acoustic signal, the proximity of the acoustic source, and the sound level received at the access points.

As described, in embodiments, the acoustic source is associated with a sewer pipe and an acoustic receiver is associated with a gas pipe. The acoustic signal generated by the acoustic source is to travel through the interior of the sewer pipe. Particularly, the acoustic signal travels (i.e., propagates) through air media within the sewer pipe, and perhaps liquid at some points within the sewer pipe. The acoustic signal is coupled to the gas pipe at a cross bore involving the sewer pipe and the gas pipe. In this case, the coupled portion of the acoustic signal is to travel through the interior of the gas pipe to be heard by the acoustic receiver. Particularly, the coupled portion of the acoustic signal travels through gas media within the gas pipe.

An advantage of the acoustic signal traveling through the air in a sewer pipe and the gas in a gap pipe is that the acoustic signal propagates through the same or similar type of media (i.e., air and gas). This ensures consistency in calibration between the acoustic source and the acoustic receiver.

Further, in embodiments, the sewer pipe associated with the acoustic source is a sewer main that is connected to a sewer lateral. The acoustic signal generated by the acoustic source is to travel through the interior of the sewer main and through the interior of the sewer lateral. In the case of a cross bore between the sewer lateral and the gas pipe, the acoustic signal is coupled from the sewer lateral to the gas pipe at the location of the cross bore. In these embodiments, the acoustic wave propagation path is from a large pipe (i.e., the sewer main) to a small pipe (i.e., the sewer lateral). Unlike acoustic wave propagation from a small pipe to a large pipe, the acoustic wave propagation from the sewer main to the sewer lateral does not reduce sound intensity.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for detecting cross bores involving a sewer system and a gas pipe, the method comprising:
   generating, by an acoustic generator placed within an interior of the sewer system, an acoustic signal to transmit through an interior of a sewer pipe of the sewer system;
   listening for the acoustic signal by an acoustic receiver placed either within an interior of the gas pipe or in proximity to an end of the gas pipe; and
   detecting, in response to the acoustic receiver hearing the acoustic signal, a cross bore involving the sewer pipe and the gas pipe.

2. The method of claim 1 wherein the acoustic receiver is a first acoustic receiver, the method further comprising:
   listening for the acoustic signal by a second acoustic receiver placed within the interior of the sewer system at a location remote from the acoustic generator; and
   determining, in response to (i) the first acoustic receiver not hearing the acoustic signal and (ii) the second acoustic receiver hearing the acoustic signal, that a cross bore involving the sewer pipe and the gas pipe is absent.

3. The method of claim 2 further comprising:
   placing the acoustic generator at a first location within the interior of the sewer system using a first access feature of the sewer system; and
   placing the second acoustic receiver at a second location within the interior of the sewer system remote from the first location using a second access feature of the sewer system.

4. The method of claim 3 wherein:
   the first access feature is a manhole, a vent, a drain, or a cleanout of the sewer system at the first location of the sewer system; and
   the second access feature is a manhole, a vent, a drain, or a cleanout of the sewer system at the second location of the sewer system.

5. The method of claim 1 further comprising:
   controlling, by a controller in communication with the acoustic generator and the acoustic receiver, the acoustic generator to generate the acoustic signal at a set time and the acoustic receiver to listen for the acoustic signal during a set period after the set time to thereby synchronize acoustic signal generation and listening.

6. The method of claim 1 further comprising:
   moving the acoustic receiver through an interior of the gas pipe;

stopping movement of the acoustic receiver upon the acoustic receiver hearing the acoustic signal; and determining a location of the cross bore as a function of a location of the acoustic receiver along the gas pipe when stopped.

7. The method of claim 1 further comprising:

moving the acoustic receiver back-and-forth through an interior of the gas pipe as a function of a magnitude of the acoustic signal as heard by the acoustic receiver;

stopping the back-and-forth movement of the acoustic receiver through the interior of the gas pipe upon the magnitude of the acoustic signal as heard by the acoustic receiver being largest; and determining a location of the cross bore as a function of a location of the acoustic receiver along the gas pipe when stopped.

8. The method of claim 1 further comprising:

placing the acoustic generator at a first location within the interior of the sewer system using a first access feature of the sewer system; and wherein the first access feature is a manhole, a vent, a drain, or a cleanout of the sewer system at the first location of the sewer system.

9. The method of claim 1 wherein:

the step of generating the acoustic signal includes modulating, by the acoustic generator, the acoustic signal with a signature pattern; and the step of detecting a cross bore involving the sewer system and the gas pipe includes detecting, in response to the acoustic receiver hearing the signature pattern, the cross bore.

10. An assembly for detecting cross bores involving a sewer system and a gas pipe, the assembly comprising:

an acoustic generator placed within an interior of the sewer system, the acoustic generator configured to generate an acoustic signal to transmit through an interior of a sewer pipe of the sewer system;

a first acoustic receiver placed either within an interior of the gas pipe or in proximity to an end of the gas pipe, the acoustic receiver configured to listen for the acoustic signal;

a second acoustic receiver placed within the interior of the sewer system at a location remote from the acoustic generator, the second acoustic receiver configured to listen for the acoustic signal; and a controller configured to detect, in response to the first acoustic receiver hearing the acoustic signal, a cross bore involving the sewer pipe and the gas pipe.

11. The assembly of claim 10 wherein the controller is further configured to determine, in response to the first acoustic receiver not hearing the acoustic signal and the second acoustic receiver hearing the acoustic signal, that a cross bore involving the sewer pipe and the gas pipe is absent.

12. The assembly of claim 10 wherein:

the acoustic generator is placed within the interior of the sewer system at a first location using a first access feature of the sewer system; and the second acoustic receiver is placed within the interior of the sewer system at a second location of the sewer system remote from the first location using a second access feature of the sewer system.

13. The assembly of claim 12 wherein:

the first access feature is a manhole, a vent, a drain, or a cleanout of the sewer system at the first location of the sewer system; and the second access feature is a manhole, a vent, a drain, or a cleanout of the sewer system at the second location of the sewer system.

14. The assembly of claim 10 wherein:

the first acoustic receiver includes a microphone, a piezo element, or a vibrometer; and the second acoustic receiver is a microphone.

15. The assembly of claim 10 wherein:

the controller is configured to control the acoustic generator to generate the acoustic signal at a set time and to control the first acoustic receiver to listen for the acoustic signal during a set period after the set time to thereby synchronize acoustic signal generation and listening.

16. The assembly of claim 10 wherein:

the first acoustic receiver is configured to move through an interior of the gas pipe; and the controller is further configured to stop movement of the first acoustic receiver upon the first acoustic receiver hearing the acoustic signal and to determine a location of the cross bore as a function of a location of the first acoustic receiver along the gas pipe when stopped.

17. The assembly of claim 10 wherein:

the controller is configured to move the first acoustic receiver back-and-forth through an interior of the gas pipe as a function of a magnitude of the acoustic signal as heard by the first acoustic receiver, to stop the back-and-forth movement of the first acoustic receiver through the interior of the gas pipe upon the magnitude of the acoustic signal as heard by the first acoustic receiver being largest, and to determine a location of the cross bore as a function of a location of the first acoustic receiver along the gas pipe when stopped.

18. The assembly of claim 10 wherein:

the acoustic generator is placed at a first location within the interior of the sewer system using a first access feature of the sewer system; and wherein the first access feature is a manhole, a vent, a drain, or a cleanout of the sewer system at the first location of the sewer system.

19. The assembly of claim 10 wherein:

the acoustic generator includes a speaker, a horn, or a piezo element; and the first acoustic receiver includes a microphone, a piezo element, or a vibrometer.

20. The assembly of claim 10 wherein the sewer pipe is a main sewer pipe that is connected to a lateral sewer pipe, the acoustic signal from the acoustic generator to transmit through the interior of the main sewer pipe and through an interior of the lateral sewer pipe, and the gas pipe is situated in proximity to the lateral sewer pipe, wherein:

the cross bore involving the sewer pipe and the gas pipe detected by the controller in response to the first acoustic receiver hearing the acoustic signal is a cross bore involving the lateral sewer pipe and the gas pipe.

21. The assembly of claim 10 wherein:

the acoustic generator is further configured to modulate the acoustic signal with a signature pattern; and the controller is further configured to detect, in response to the first acoustic receiver hearing the signature pattern, the cross bore.

22. An assembly for detecting cross bores involving a sewer system and a gas pipe, the assembly comprising:

a first acoustic generator designed to generate a first acoustic signal within an interior of a main sewer pipe;

a second acoustic generator placed within the interior of the main sewer pipe at a location remote from the first acoustic generator, the second acoustic generator configured to generate a second acoustic signal to transmit through the interior of the main sewer pipe and through the interior of the lateral sewer pipe;

an acoustic receiver configured to listen for the second acoustic signal; and the controller configured to detect, in response to the acoustic receiver hearing the second acoustic signal, a cross bore involving the lateral sewer pipe and the gas pipe.

\* \* \* \* \*